(No Model.)
R. RATHBONE.
LITHOGRAPHIC PRINTING MACHINE.
No. 268,043. Patented Nov. 28, 1882.
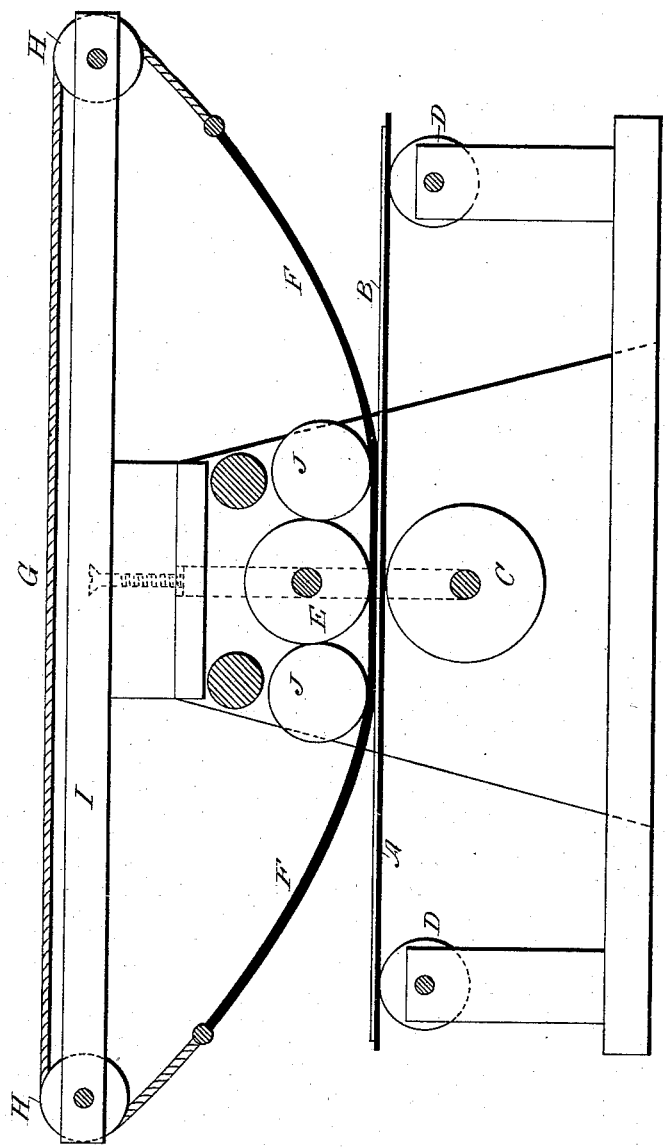
Witnesses.
H. C. Johnston.
Jas. M. Carter
Inventor:
Ransom Rathbone,
by
Francis Clare Bowen
Attorney

UNITED STATES PATENT OFFICE.

RANSOM RATHBONE, OF BROOKLYN, NEW YORK.

LITHOGRAPHIC-PRINTING MACHINE.

SPECIFICATION forming part of Letters Patent No. 268,043, dated November 28, 1882.

Application filed March 20, 1882. (No model.)

*To all whom it may concern:*

Be it known that I, RANSOM RATHBONE, a citizen of the United States, residing at Brooklyn, in the county of Kings and State of New York, have invented certain new and useful Improvements in Lithographic-Printing Machines, of which the following is a specification, reference being had therein to the accompanying drawing.

My invention relates to machines for embossing or printing in which the article to be embossed or printed rests upon an embossing-plate and between the embossing-plate and a blanket, and is carried with them between rollers having a sufficient pressure to leave the imprint of the plate upon the surface of the goods.

The object of my invention is to produce a machine which will do the work more rapidly and conveniently than others now in use. I attain these objects by the mechanism illustrated in the accompanying drawing, in which the figure is a vertical longitudinal section of my improved embossing or printing machine.

A is the table.

B is the embossing or printing plate.

C is the lower main roller, upon which the table rests.

D D are auxiliary rollers to help support the table and keep it in a horizontal position.

E is the driving-roller.

F is the blanket, the ends of which are suspended above the table by means of the cord G and pulleys H H in the ends of the frame I. The blanket F is thus suspended so as not to interfere with the operator in placing the article to be embossed or printed upon the plate and removing the same therefrom when finished.

In operating my machine I cause a rotary reciprocating motion to be given to the rollers E and C of sufficient extent to carry the table A, holding the embossing or printing plate B the distance required, the blanket F moving with them between the rollers E and C, while, by means of the cord G running over the pulleys H H, the ends of the blankets are raised from the plate as they pass from under the rollers, so that the embossed or printed article may be readily removed and another piece to be embossed or printed put in its place as the machine is reversed, so that the machine is at work embossing or printing on both its forward and backward motions.

J J are loose rollers resting upon the blanket, one each side of the roller E, and are for the purpose of holding the blanket down upon the article being printed to keep it flat and smooth as it passes under the roller E.

Having thus described my invention, what I claim as new, and desire to secure by Letters Patent, is—

The combination of the blanket F, pulleys H H, cord G, and loose rollers J J with the rollers E and C, the table A, and frame I, substantially as and for the purpose set forth.

In testimony whereof I affix my signature in presence of two witnesses.

RANSOM RATHBONE.

Witnesses:
   FRANCIS CLARE BOWEN,
   A. JAMES LASKE.